United States Patent Office

Re. 26,188
Reissued Apr. 11, 1967

26,188
HYDROCARBON CONVERSION PROCESS

Charles Newton Kimberlin, Jr., and Elroy Merle Gladrow, Baton Rouge, La., assignors to Esso Research and Engineering Company, a corporation of Delaware No Drawing. Original No. 2,971,903, dated Feb. 14, 1961, Ser. No. 638,232, Feb. 5, 1957. Application for reissue Aug. 24, 1962, Ser. No. 219,349
21 Claims. (Cl. 208—120)

Matter enclosed in heavy brackets [ ] appears in the original patent but forms no part of this reissue specification; matter printed in italics indicates the additions made by reissue.

The present invention is concerned with a process for the preparation of improved catalysts. It more specifically relates to the preparation of improved catalysts suitable for use in cracking, reforming aromatization, isomerization, polymerization and alkylation processes. In accordance with the present invention, an improved crystalline silica and alumina comprising catalyst is employed in these hydrocarbon conversion processes.

It is known in the art to improve the quality of hydrocarbons, particularly petroleum hydrocarbons, by treating them with catalysts under various operating conditions to effect the above-enumerated conversions. For example, it is well known to treat petroleum oils boiling in the range above about 400° F. with a silica-magnesia or a silica-alumina catalyst at temperatures in the range of about 600° to 1100° F. in order to crack the oils and secure petroleum oils fractions boiling in the motor fuel boiling range. Similarly, it is also known to alkylate isoparaffins or aromatic hydrocarbons with silica-alumina cracking catalysts. It is also known that synthetic porous solids, comprising silica and one or more metallic oxides, such as alumina, magnesia, zirconia, beryllia, boria, and others, have catalytic properties for the treatment of petroleum hydrocarbons.

Heretofore, these catalysts have been prepared by various procedures. One method, for instance, is to prepare a silica hydrogel and impregnate the latter with a solution of a salt of magnesium, aluminum, beryllium, zirconium, or other desired metal salt, and then followed by treatment of the hydrogel with ammonia in order to precipitate the magnesia and/or the oxide of the added metal within the gel structure. Another method involves mixing dried silica hydrogel with magnesia and the oxide of the third metal. Still another has been to mull magnesia with the silica hydrogel in water followed by drying and activation.

From the preceding it is apparent that the general procedure for preparing these conversion catalysts is to prepare the silica hydrogel or hydrosol, mixing the same with magnesia to secure the desired silica-magnesia composition, and adding, if desired, oxides of group II, III, IV, VI and VIII metals, including zinc, titanium, aluminum, zirconium, cadmium, chromium, vanadium, copper and iron. By whatever means prepared, the final catalyst was amorphous and, indeed, if any crystalline material were present in the final product, hydrocarbon conversion was seriously adversely affected and byproduct formation increased.

These catalysts, while both very active and selective in their action on the hydrocarbon feed, have some drawbacks. These seem to stem inherently from the amorphous nature of the catalyst that one strives to achieve. The amorphous gels comprise pores covering a wide range of sizes, from less than about 5 Angstroms diameter to as much as 200 Angstroms diameter or more. In the very fine pores, a feed molecule encounters diffusion difficulties, with the net result that the feed molecules do not have free access over all the surface, and the product molecules may not evaporate from the pore before being converted further to a high boiling hydrogen-deficient coke deposit. The coke deposit may cover up some of the active catalytic agent and also require more frequent regeneration of the catalyst by burning the coke off with air. All of these devices shorten average catalyst life.

The conventional gel type catalysts mentioned above comprising silica, alumina, magnesia, and other oxides in combinations of two or more components are acidic in nature. In the case of silica-alumina catalysts, it is generally considered that the strong acid site is formed by the condensation of SiOH and AlOH groups. The dispersion of these acid sites throughout the amorphous gel structure determines the ultimate performance of the catalyst. The more uniformly the active sites are dispersed, the better the catalyst. There should not be isolated regions of silica or alumina in the particular case with silica-alumina catalysts. The mechanism by which hydrocarbons react over gel type catalysts in which the catalyst is behaving like an acid is through the formation of carbonium ions. Carbonium ion type reactions are those involved in cracking, alkylation, polymerization, and isomerization. But to those skilled in the art the credo with gel catalysts has been: the more amorphous the gel, the better the dispersion, and hence, the better the catalyst. However, a catalyst has been discovered that shows high activity and selectivity while comprising a highly ordered crystalline material characterized by having pores of nearly uniform dimensions in the range of about 6 to 15 Angstroms. This catalyst comprises an alumino-silicate anionic cage structure in which the alumina and silica tetrahedra are intimately connected to each other. Hydrogen or various metal cations are distributed throughout the structure to maintain electrical neutrality. The dispersion of the silica and alumina tetrahedra is highly ordered, thereby making for a maximum number of active sites caused by the condensation of SiOH and AlOH groups. It is hard to conceive of how a structure could be built having more active sites, be it either amorphous or crystalline. The uniform pore openings in the range of about 6 to 15 Angstroms allow for easy ingress of all hydrocarbon feed types and egress of the reaction products. This serves to lower catalytic coke buildup within the structure and improve regeneration characteristics of the catalyst.

The catalyst of the invention, as mentioned above, is a crystalline alumina-silicate and can be base exchanged with numerous metal or hydrogen cations. In this regard it resembles a zeolite, some of which are known to possess activity as cracking catalysts. However, the catalyst of the invention may be distinguished over the zeolite art by the nearly uniform pore openings.

In accordance with the present invention, there is employed as a hydrocarbon conversion catalyst a metal salt of a crystalline alumino-silicate having pore openings adequate to admit freely the individual molecules to be converted. The pore openings will therefore be about 6 to 15 Angstroms. Random size openings are not satisfactory when they cover a wide range for the reasons mentioned above.

Alumino-silicates of high conversion activity may be prepared by mixing and heating sodium aluminate and sodium silicate, preferably sodium metasilicate under carefully controlled conditions of temperature, concentrations, and alkalinity, to produce a crystalline product which is subsequently dehydrated under conditions to preserve the crystalline structure. The sodium content of the alumino-silicate is thereafter replaced at least in part by effecting ion exchange with the appropriate metal salt, such as magnesium.

The preparation of the catalyst involves the maintenance of several critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either not be crystalline, or it will have little or no adsorptive properties, the pores will not be uniform, or the pores, if uniform, will be too small to admit any but small diameter molecules. If the conditions are observed, the pores will be large enough to admit most organic molecules, and will be between 6 and 15 Angstroms.

The ratio of $Na_2O/SiO_2$ in the silicate employed must be at least 0.5/1, but may be as high as 2/1. Preferably, the ratio is 0.7/1 to 1/1, and the desired reagent is sodium metasilicate. If water glass is employed, additional caustic must be present.

The composition of the sodium aluminate is less critical. Sodium aluminates having any ratio of soda to alumina in the range of 1/1 to 3/1 may be employed; however, a sodium aluminate having a high ratio of soda to alumina is preferred, and a sodium aluminate having the ratio of about 1.5/1 $Na_2O/Al_2O_3$ is particularly desirable. The amounts of sodium silicate solution and sodium aluminate solutions are such that the mol ratio of silica to alumina in the final mixture is at least 2.2/1, and preferably 2.5–4/1. However, silica to alumina ratios as high as 10/1 may be employed.

The method of mixing the sodium metasilicate and sodium aluminate solutions must be carried out in a manner allowing formations of a precipitate having a uniform composition. A good method is to add the aluminate to the silicate at ambient temperatures using rapid and efficient agitation to make a homogeneous paste. Thereafter, the mixture is heated to about 180° to 215° F. for a period up to 200 hours or more to ensure crystallization in the form having interstices large enough to adsorb isoparaffinic and aromatic molecules. The heat-soaking step is essential; however, heating at temperatures of about 350° F., and higher does not produce a crystalline composition having the desired uniform size pore openings.

A general scheme for preparing the hydrocarbon conversion catalyst is as follows: A solution of sodium metasilicate is prepared, having a concentration of 30 to 300 grams, preferably 100 to 200 grams/liter. Similarly, a solution of sodium aluminate having an $Al_2O_3$ concentration of 40 to 400 grams, preferably 200 to 300 grams, is prepared. The amounts of metasilicate and aluminate solutions employed are such that the ratio of $SiO_2/Al_2O_3$ in the final mixture is 2.2/1 to 10/1, preferably 2.5/1 to 4/1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours, and shorter at higher temperatures, although long heating times may be employed without producing any deleterious effects.

The crystalline product resulting from the heat-treating step is then preferably reacted with the salt of a metal of the type previously enumerated to prepare the active catalyst, though for some catalytic purposes the sodium form itself may be employed. In the latter case, the crystalline material is water-washed, filtered, and heat activated by calcination at 400 to 1000° F., preferably about 700 to 900° F. The crystalline sodium alumino-silicate formed during the heat soaking period has the stoichiometric composition of $Na_2O.Al_2O_3.2.7SiO_2$. In the majority of cases, however, it is desirable to convert the sodium form of the alumino-silicate crystal to a more active form. For this purpose, the sodium crystals are reacted with metal salt solutions that enhance the catalytic behavior. These metals are of the type already enumerated, and may further include cobalt, nickel, copper, calcium, magnesium, chromium, iron, silver, gold, platinum, zinc, cadmium, rare earths, mercury, lead and the like. For hydrocarbon conversion catalysts of the cracking or alkylation type, it is particularly desirable to exchange the sodium with magnesium; for aromatization, with chromium or zinc or platinum or palladium; for hydroforming or hydrodesulfurization, with cobalt, iron, or platinum.

When reacting the crystalline sodium alumino-silicate with another metal salt solution, it is only necessary to replace about two-thirds of the soda with the other metal oxide. The removal of more soda than this does not bear too great an influence on the behavior of the crystals as catalysts. In the specific case of the magnesium form of the alumino-silicate, the relative stoichiometric composition is about $$(0.33)Na_2O.(0.67)MgO.Al_2O_3.(2.7)SiO_2$$

By modifying the conditions of synthesis, it is possible to obtain crystals having pores between about 3 and 5 Angstroms diameter. Other metal forms of this crystalline sodium alumino-silicate may be prepared in a manner identical with the above 6 to 15 A. pore diameter crystal. The reactions which the 3 to 5 A. pore diameter catalyst will promote are identical with the same metal form of the 6 to 15 A. pore diameter material. However, the 3 to 5 A. pore diameter crystals will not allow any but straight chain paraffins and olefins to enter the interior of the pores which present the active catalyst sites. Thus, branched chains, acyclics and all ring hydrocarbons are excluded from the catalytic sites, thus restricting the versatility and usage of this material as a catalyst. For the same reason as was advanced for high carbon deposits in the minute pores with gel type catalysts, the 3 to 5 Angstrom pore diameter crystals also yield relatively large amounts of catalytic coke. This limits the use of the 3 to 5 Angstrom material as a catalytic agent.

The process of the present invention will be more readily understood by reference to the following examples illustrating the same. The catalytic reactions involved, such as cracking, alkylation, isomerization and the like are so well known that they need not be redescribed, in that the process for carrying out the reactions form no part of this invention, save the employment of the catalyst. Thus, catalytic cracking may be carried out in fixed bed or fluidized solids bed operation at temperatures of 800 to 1000° F., and pressures of 0 to 200 p.s.i.g. in a manner known per se. Catalytic alkylation, particularly of aromatics, is normally carried out in a fixed bed at temperatures of 400° to 850° F., and pressures of 0 to 1000 p.s.i.g.

EXAMPLE 1

A sodium alumino-silicate having pore openings of about 4 Angstroms was prepared as follows: Four liters of water are heated to near boiling. A separate vessel contained 6 kg. of a solution comprising 1176 grams sodium metasilicate ($Na_2O.SiO_2$). A third vessel contained 1970 cc. of a sodium aluminate solution comprising 20% $Al_2O_3$ and 1.5 mols $Na_2O$ per mol $Al_2O_3$. The hot water was rapidly stirred and the silicate and aluminate solutions were added simultaneously through separate lines to the vessel initially containing the water. The temperature was kept at 210–215° F. for a total of 50 minutes. The slurry was filtered and washed well with water. A chemical analysis showed it to have the relative stoichiometric composition of $Na_2O.Al_2O_3.2SiO_2$. This material was heat activated for 4 hours at 850° F.

It had pore openings large enough to admit ethane, but it displayed no absorptive capacity for n-heptane. It is designated as catalyst "A" in suceeding examples.

EXAMPLE 2

A portion of catalyst "A," prior to heat treatment, was slurried with a solution of calcium chloride, filtered, water washed, and heated for four hours at 850° F. This crystalline material, having a molecular composition of $(0.28)Na_2O.(0.71)CaO.Al_2O_3.(2)SiO_2$ had an absorptive capacity for n-heptane of 0.19 cc./gram. Its pore opening was 5 Angstrom units, and is desiganted as catalyst "B."

EXAMPLE 3

A 250 gram portion of catalyst "A" was slurried in 1200 cc. of 10% $MgCl_2$ solution for one hour. After filtration, water washing and re-slurrying were repeated three more times. The final filter cake was dried and heated for four hours at 850° F. Analyses of the composite showed that about 61.6 mol percent of the original soda content had been replaced with magnesia, and it had an absorptive capacity for n-heptane of 0.12 cc./gram. It corresponds to a composition $$0.38Na_2O.0.62MgO.Al_2O_3.2SiO_2$$

has a pore opening of 5 Angstroms, and is designated catalyst "C."

EXAMPLE 4

A crystalline sodium alumino-silicate having a uniform pore opening of about 13 Angstroms was prepared as follows: forty-three hundred and fifty grams of sodium metasilicate ($Na_2O.SiO_2.5H_2O$) are dissolved in 13 liters $H_2O$ at room temperature. Using rapid stirring, 2650 grams of a sodium aluminate solution (20% $Al_2O_3$ and $1.5Na_2O.Al_2O_2$ molar composition) are added to the silicate solution. An additional 10 liters $H_2O$ are added to facilitate stirring. The composite slurry is heated to 180° to 210° F., and maintained at these temperatures for 240 hours. The slurry is cooled, filtered, and washed well with water. After oven drying at 250° F. and calcining for 4 hours at 850° F., the material was analyzed and showed the relative stoichiometric composition of $Na_2O.Al_2O_3.2.7SiO_2$. The product had an adsorptive capacity for n-heptane and toluene of about 0.20 cc./gram. This is catalyst "D."

EXAMPLE 5

Five hundred grams of pelleted catalyst "D" were slurried in a liter of water, and 1500 cc. of 12% $MgCl_2$ solution was added. The composite was stirred for two hours, the liquid decanted, and the pellets washed twice with 500 cc. water. The base exchange operation was repeated two more times with fresh 12% $MgCl_2$ solution. The wet pellets were dried in an oven at 250° F. and calcined 4 hours at 850° F. On analysis, 76% of the soda had been replaced by magnesia. The resulting product, catalyst "E," had an adsorption capacity of 0.13 cc. n-heptane/gram and had a uniform pore size of about 13 Angstroms diameter.

EXAMPLE 6

A typical synthetic zeolite "Doucil" comprises a plural gel, containing three components, viz. $Na_2O$, $Al_2O_3$, and $SiO_2$. To determine the cracking properties of this zeolite, a portion of this sodium aluminum silicate was dried, ground, pilled, and activated at 850° F. This product is catalyst "F."

EXAMPLE 7

This example illustrates the preparation of a magnesium form of a synthetic zeolite "Doucil." Commercial "Doucil," the trade name for a good grade of sodium aluminum silicate, was ground and contacted with a magnesium chloride solution until all the readily replaceable $Na_2O$ was removed by base exchange to form largely magnesium aluminum silicate. This product, after washing until it gave a negative test for chloride ion, was dried, ground, pelleted, and activated by heating at 850° F. This material is referred to as catalyst "G."

EXAMPLE 8

These catalysts were used to crack an East Texas light gas oil. The catalysts were made into 3/16" flat cylindrical pellets and tested for cracking activity in a fixed bed testing unit at 850° F., and 0.6 vol. of feed/vol. of catalyst/hour for a two hour cycle. The results obtained are tabulated as follows:

| Catalyst | A | B | C | D | E | F | G |
|---|---|---|---|---|---|---|---|
| Percent D+L, Vol. percent | 4.0 | 9.5 | 11.5 | 15.0 | 44.5 | 3.0 | 11.0 |
| Gas Producing Factor (GPF) | 1.5 | 2.6 | 2.5 | 1.8 | 0.9 | ----- | ----- |
| Carbon Producing Factor (CPF) | 12.7 | 10.1 | 8 | 10.1 | 1.2 | ----- | ----- |

The standardized test has been described by Conn and Connolly in Ind. Eng. Chem. 39, 1138 (1947), and is set forth in U.S. 2,636,845. The sum of D+L, or distillate plus loss, is a criterion of activity and selectivity, showing the yield of desirable product. The relative gas production factor, GPF, and the relative carbon producing factor, CPF, are indicative of the amount of gas and carbon formed in commercial fluid cracking plants.

These data show that by far the highest catalytic activity was shown by the magnesium alumino-silicate catalyst "E" having a pore opening of about 13 Angstrom units. The same catalyst also showed the highest selectivity to desired gasoline product, i.e. lowest GPF and CPF.

EXAMPLE 9

Catalyst "E" above was regenerated by burning off the coke at 850° F. and retested. In the second cycle it showed 45.0 vol. percent D+L, a GPF of 0.9 and a CPF of 1.37. It is thus seen that the catalyst is readily regenerable to full activity and selectivity.

EXAMPLE 10

Catalysts "D" and "E" were tested for alkylation activity by contacting with propylene and toluene mixtures at 850° F., and atmospheric pressures. Feed rates were about 0.64 v./v./hour for the toluene and about 5 mols propylene per mol of toluene feed. The results are tabulated below:

| Catalyst | "D" | "E" |
|---|---|---|
| Liquid Product, $C_6$+ | | |
| Mol Percent Toluene | 89.9 | 69.3 |
| Mol percent $C_9$-$C_{12}$-$C_{13}$ aromatics | 8.3 | 17.7 |

These data show that while the sodium form of the alumino-silicate has some alkylating activity, the magnesium form is considerably more active. That these alkaline reacting catalysts have any alkylation activity at all is surprising. Normally, powerful electrophilic reagents, such as the Friedel-Crafts type catalysts, the aluminum, iron, tin, zinc, etc. halides, $H_2SO_4$, HF, $P_2O_5$, etc. are employed. Indeed, with metal halides, HCl or HBr is essential for catalysts. The recognized alkylation catalysts are acidic in nature; the sodium form of the alumino-silicate, however, in an aqueous suspension shows a pH of about 10–11.

Furthermore, catalysts "C" and "E" contain substantial amounts of residual soda, namely 12.7 and 9.2% $Na_2O$ respectively. Inasmuch as conventional gel type catalysts are acidic in nature and are poisoned by soda content above about 0.5% $Na_2O$, the high cracking activity obtained with these catalysts is particularly surprising and unexpected.

What is claimed is:

[1. A process for upgrading hydrocarbons which comprises contacting a hydrocarbonaceous fluid in a conversion zone at elevated temperatures with a crystalline metallic alumino-silicate catalyst having uniform pore openings between about 6 and about 15 Angstrom units, said material being the sole conversion catalyst in said zone and recovering an upgraded hydrocarbon product having a molecular weight no higher than said first named hydrocarbonaceous fluid.]

[2. The process of claim 1 wherein said catalyst comprises a member of the alkaline earth group.]

[3. The process of claim 1 wherein said catalyst comprises a member of the platinum group.]

[4. The process of claim 1 wherein said catalyst comprises a member of the iron group.]

[5. The process of claim 1 wherein said catalyst comprises chromium.]

[6. The process of claim 1 wherein said catalyst has the empirical formula $$\frac{Me_2O}{n}\cdot Al_2O_3\cdot 2.7SiO_2$$

where ME is a metal and n the valence thereof.]

[7. The process of claim 1 wherein a gas oil is cracked in the presence of said catalyst and the metallic alumino-silicate comprises magnesium.]

[8. The process of claim 1 wherein a hydrocarbon stream is isomerized in the presence of said crystalline metallic alumino-silicate catalyst.]

[9. The process of claim 1 wherein a hydrocarbon stream is aromatized in the presence of said crystalline metallic alumino-silicate catalyst, said alumino-silicate being substantially free of exchangeable sodium and selected from the class consisting of chromium, zinc, platinum and palladium alumino-silicates.]

[10. The process of claim 1 wherein a hydrocarbon stream is hydroformed in the presence of said crystalline metallic alumino-silicate catalyst, said alumino-silicate being substantially free of exchangeable sodium and selected from the class consisting of cobalt, iron and platinum alumino-silicates.]

[11. A process for cracking a gas oil which comprises contacting said feed at a temperature of about 800° to 1000° F. and at a pressure of about 0 to 1000 p.s.i.g. with a catalyst consisting essentially of a crystalline magnesium alumino-silicate having a uniform pore opening of about 6 to 13 Angstrom units.]

*12. A process for upgrading hydrocarbons which comprises contacting a hydrocarbonaceous fluid in a conversion zone at elevated temperatures with a crystalline metallic aluminosilicate catalyst having uniform pore openings between about 6 and about 15 Angstrom units, said material being the sole conversion catalyst in said zone and recovering an upgraded hydrocarbon product having a molecular weight no higher than said first named hydrocarbonaceous fluid.*

*13. The process of claim 12 wherein said catalyst comprises a member of the alkaline earth group.*

*14. A hydrocarbon conversion process which comprises contacting a hydrocarbon fluid in a conversion zone at elevated temperatures, under conditions to effect a conversion of said hydrocarbon fluid, with a crystalline metallic alumino-silicate catalyst having uniform pore openings between about 6 and about 15 Angstrom units, said material being the sole conversion catalyst in said zone and recovering a converted hydrocarbon product having a mol. wgt. no higher than said first named hydrocarbon fluid.*

*15. The process of claim 14, wherein said catalyst comprises a member of the alkaline earth group.*

*16. The process of claim 14, wherein said catalyst comprises a member of the platinum group.*

*17. A process for cracking a gas oil which comprises contacting said feed at a temperature of about 800° to 1000° F. and at a pressure of about 0 to 1000 p.s.i.g. with a catalyst consisting essentially of a crystalline magnesium alumino-silicate having a uniform pore opening of about 6 to 13 Angstrom units.*

*18. A hydrocarbon conversion process which comprises contacting a hydrocarbon fluid in a conversion zone at an elevated temperature with a crystalline metallic alumino-silicate catalyst having uniform pore openings between about 6 and about 15 Angstrom units, said catalyst having been prepared by base exchange of the sodium form of the crystalline alumino-silicate with a cation to substantially reduce its sodium content and thus improve its catalytic ability for carrying out said conversion, and recovering a converted hydrocarbon product having a molecular weight no higher than said first-named hydrocarbon fluid.*

*19. The process of claim 18, wherein a gas oil is cracked in the presence of said catalyst and the metallic alumino-silicate comprises magnesium.*

*20. The process of claim 18, wherein a hydrocarbon stream is isomerized in the presence of said crystalline metallic alumino-silicate catalyst.*

*21 The process of claim 18, wherein a hydrocarbon stream is aromatized in the presence of said crystalline metallic alumino-silicate catalyst, said alumino-silicate being substantially free of exchangeable sodium and selected from the class consisting of chromium, zinc, platinum and palladium alumino-silicates.*

*22. The process of claim 18, wherein a hydrocarbon stream is hydroformed in the presence of said crystalline metallic alumino-silicate catalyst, said alumino-silicate being substantially free of exchangeable sodium and selected from the class consisting of cobalt, iron and platinum alumino-silicates.*

*23. The process of claim 18, wherein higher molecular weight hydrocarbons are cracked into lower molecular weight hydrocarbons.*

*24. A hydrocarbon conversion process which comprises contacting a hydrocarbon fluid in a conversion zone at an elevated temperature with a crystalline alumino-silicate catalyst having uniform pore openings between about 6 and about 15 A., said alumino-silicate having the major portion of its cation content supplied by a cation other than sodium, and recovering a converted hydrocarbon product having a molecular weight no higher than said first-named hydrocarbon fluid.*

*25. The process of claim 24, wherein said cation other than sodium comprises an alkaline earth metal.*

*26. The process of claim 25, wherein higher molecular weight hydrocarbons are cracked into lower molecular weight hydrocarbons and said alkaline earth metal is magnesium.*

*27. The process of claim 24, wherein said cation other than sodium comprises a rare earth metal.*

*28. The process of claim 24, wherein said cation other than sodium comprises a platinum group metal.*

*29. The process of claim 25, wherein said alkaline earth metal is calcium.*

*30. The process of claim 24, wherein higher molecular weight hydrocarbons are cracked into lower molecular weight hydrocarbons and the pore openings of said catalyst have a diameter of about 13 A.*

*31. A hydrocarbon conversion process which comprises contacting a hydrocarbon fluid in a conversion zone at an elevated temperature with a crystalline alumino-silicate catalyst having uniform pore openings between about 6 and about 15 A., said alumino-silicate being substantially free of exchangeable sodium, and recovering a converted hydrocarbon product having a molecular weight no higher than said first-named hydrocarbon fluid.*

*32. A process for cracking a gas oil which comprises contacting said gas oil at a temperature of about 800° to 1000° F. and at a pressure of about 0 to 1000 p.s.i.g. with a crystalline metallic alumino-silicate catalyst having uniform pore openings between about 6 and about 15 A., said alumino-silicate having the major portion of its cation content supplied by a cation other than sodium.*

References Cited by the Examiner

The following references, cited by the Examiner, are of record in the patented file of this patent or the original patent.

UNITED STATES PATENTS

| | | | |
|---|---|---|---|
| 2,522,426 | 9/1950 | Black | 183—114.3 |
| 2,818,455 | 12/1957 | Ballard et al. | 260—676 |
| 2,834,429 | 5/1958 | Kinsella | 183—114.3 |
| 2,904,607 | 9/1959 | Mattox et al. | 260—671 |
| 2,962,435 | 11/1960 | Fleck et al. | 208—119 |
| 2,971,904 | 2/1961 | Gladrow et al. | 208—135 |

DELBERT E. GANTZ, *Primary Examiner.*

ALPHONSO D. SULLIVAN, *Examiner.*

S. P. JONES, *Assistant Examiner.*